United States Patent
Suzuki

(10) Patent No.: US 10,321,011 B2
(45) Date of Patent: Jun. 11, 2019

(54) COMBINING INPUT IMAGE WITH GENERATED IMAGE OF REGISTERED CHARACTER USING CHARACTER CODE TO GENERATE IMAGE TO BE PRINTED

(71) Applicant: CANON KABUSHIKI KAISHA, Tokyo (JP)

(72) Inventor: Kiwamu Suzuki, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 5 days.

(21) Appl. No.: 14/948,543

(22) Filed: Nov. 23, 2015

(65) Prior Publication Data

US 2016/0156804 A1 Jun. 2, 2016

(30) Foreign Application Priority Data

Nov. 28, 2014 (JP) .................................. 2014-242131

(51) Int. Cl.
H04N 1/32 (2006.01)
H04N 1/00 (2006.01)
H04N 1/44 (2006.01)

(52) U.S. Cl.
CPC ..... *H04N 1/32122* (2013.01); *H04N 1/00498* (2013.01); *H04N 1/4413* (2013.01); *H04N 2201/0094* (2013.01)

(58) Field of Classification Search
CPC ....................... H04N 1/32101; H04N 1/32122
USPC ........................................................ 358/1.11
See application file for complete search history.

(56) References Cited

U.S. PATENT DOCUMENTS

| 8,749,844 B2 | 6/2014 | Shibano | |
| 2004/0187061 A1* | 9/2004 | Matsuda | G06F 17/2217 714/746 |
| 2006/0075341 A1* | 4/2006 | Lin | G06F 17/214 715/269 |
| 2007/0086031 A1* | 4/2007 | Li | G06K 15/02 358/1.11 |
| 2007/0088732 A1* | 4/2007 | Chen | G06F 17/30448 |
| 2007/0258661 A1* | 11/2007 | Koshi | H04N 1/40068 358/1.11 |
| 2011/0007351 A1 | 1/2011 | Kurumasa | |
| 2011/0157634 A1 | 6/2011 | Shibata | |
| 2011/0310432 A1* | 12/2011 | Waki | G06F 3/1205 358/1.15 |
| 2014/0153012 A1* | 6/2014 | Seguin | G06F 3/121 358/1.11 |
| 2016/0034753 A1* | 2/2016 | Harada | G06K 9/6828 382/229 |

FOREIGN PATENT DOCUMENTS

| EP | 2852141 A1 | 3/2015 |
| JP | 2859208 B2 | 2/1999 |
| JP | 2006-007572 A | 1/2006 |
| JP | 2009-049877 A | 3/2009 |

\* cited by examiner

*Primary Examiner* — Eric A. Rust
(74) *Attorney, Agent, or Firm* — Canon U.S.A., Inc. IP Division

(57) ABSTRACT

In a process of printing an arbitrary text string using a composite print function, in a case where font extension using a font of a display language is not possible, a character at a first position in the text string is extracted and a font is retrieved that allows font extension for the extracted character. Using the retrieved font, font extension is performed for the text string.

12 Claims, 15 Drawing Sheets

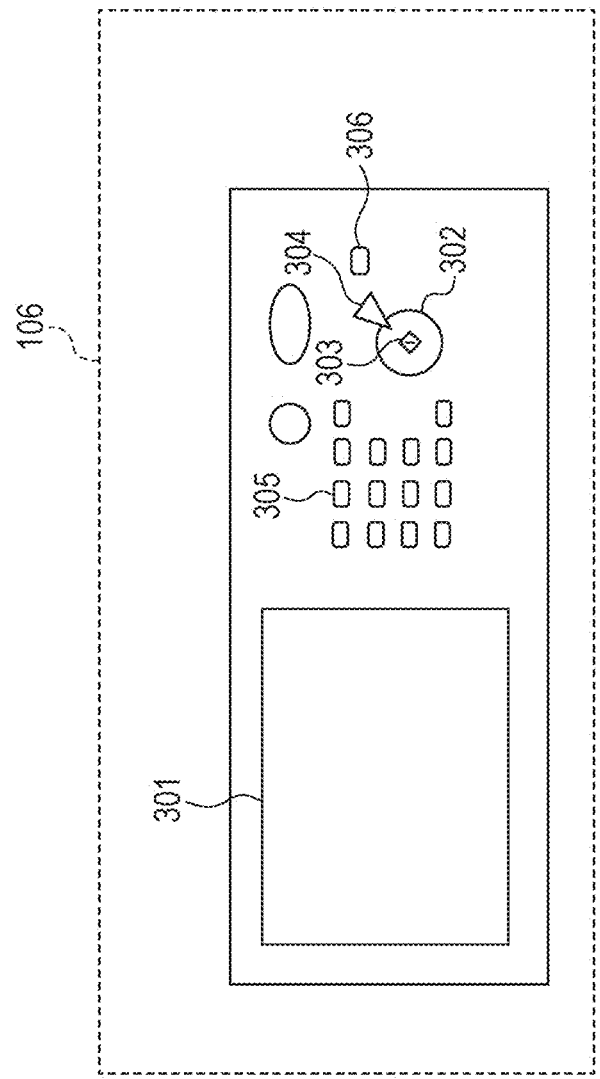

FIG. 6C

```
| ADMINISTRATOR | <TEXT STRING (UP TO 32 SINGLE-BYTE CHARACTERS OR 16 DOUBLE-BYTE CHARACTERS)>   609
| MAIN MENU     | YOU CAN ALSO USE TEN-KEY PAD.
|               | AAAA|
| CUSTOM MENU   | ◀ ▶  BACKSPACE              KANA/KANJI ▼
|               | 1 2 3 4 5 6 7 8 9 0 - = \
|               | q w e r t y u i o p
| INDIVIDUAL    | a s d f g h j k l ; :
| SETTINGS      | ` z x c v b n m , . / @
|               | SHIFT | KANA/KATA-KANA | SPACE/CONVERT (NEXT CANDIDATE) | CONFIRM
|               | ✕ CANCEL              610       OK ↵
| CHECK STATUS/CANCEL  OPERATING IN SYSTEM MANAGEMENT MODE.   LOG OUT
```

FIG. 6D

```
| ADMINISTRATOR | SETTING/REGISTRATION                                611
| MAIN MENU     | <EXTENSION SETTINGS IN TERMS OF NUMBER OF COPIES AND PRINTING: SETTING OF TEXT STRING>
| CUSTOM MENU   | INPUT TEXT STRING TO BE PRINTED OR SELECT FROM REGISTERED TEXT STRINGS.
|               | 614 — AAAA          INPUT ▶
| INDIVIDUAL    | REGISTERED TEXT STRINGS
| SETTINGS      |                           1/1
|               |                              ▲▼   615
|               | ✕ CANCEL  ◀ BACK   NEXT ▶
| CHECK STATUS/CANCEL  OPERATING IN SYSTEM MANAGEMENT MODE.   LOG OUT
```

COMBINING INPUT IMAGE WITH GENERATED IMAGE OF REGISTERED CHARACTER USING CHARACTER CODE TO GENERATE IMAGE TO BE PRINTED

BACKGROUND OF THE INVENTION

Field of the Invention

The present invention relates to an image forming apparatus capable of combining an additional print image such as a page number, a date, a text string, or the like to an original image and printing a resultant composite image on paper, and a method and a program of controlling an image forming apparatus.

Description of the Related Art

When a copy of an original is generated using an image forming apparatus, it is known to use a composite print function to combine a print image to be added, such as a page number, a date, a stamp, a woven pattern, or the like, to an original image and print a resultant composite image on paper (Japanese Patent Publication No. 2859208). It is also known to configure an image forming apparatus to have a function of performing user authentication using a user authentication technique when the image forming apparatus is started by a user, and provide customization in terms of, for example, a display language depending on the user.

The composite print function is a function of combining an additional print image such as a page number, a date, the number of copies, an arbitrary text string, or the like with an original image. Combining of an additional print image is performed when printing is performed such that a resultant composite image is generated by combining the additional print image with an original image and the resultant composite image is printed.

When a user wants to add a print image, the user may select desired one of composite print functions respectively corresponding to a page number, a date, and the like and may perform printing using the selected composite print function.

For example, to add a page number, a page print function is selected and then a desired template is selected from available page print templates such as only a page number, a page number put between hyphens, a page number with a chapter number, a page number with a total page number, and the like.

To add an arbitrary text string, a character print function is selected and the arbitrary text string to be added is input. Note that a plurality of composite print functions may be selected and enabled at the same time. For example, the page print function and the date print function may be selected and both may be enabled.

After the composite print function is set, if a print job such as a copy job, a print job, or the like is executed, a specified additional print image is combined with an original according to the selected composite print template. In this process, characters to be added are formed using the same character font as that used in a display language selected by a job execution user thereby generating a text string image to be added. The process of generating a text string image using a font is referred to as a font extension.

For example, in a case where when a job is executed in a situation in which "English" is specified as the display language, the font extension is performed using, for example, a Courier font used in "English". Similarly, in a case where the display language is "Japanese", the font extension is performed using, for example, a Mincho font used in "Japanese".

However, when "English" is used as the display language when a job is executed, it is not capable of forming "Japanese" characters using the Courier font used in the "English" display language, and thus the font extension is impossible for the given Japanese characters. That is, when the font extension using a font used in the display language is tried on an arbitrary text string, there is a possibility that a text string image is not generated correctly.

SUMMARY OF THE INVENTION

In an aspect of the invention, an image forming apparatus includes a registration unit configured to register an arbitrary text string to be used in composite printing on a print medium, a determination unit configured to determine whether font extension using a font of a display language is possible for the arbitrary text string, and a generation unit configured to generate a text string image to be added such that in a case where the font extension is possible, the text string image to be added is generated using a font of the display language, but in a case where the font extension is not possible, a font allowing the font extension is detected, and the text string image to be added is generated using the detected font.

Further features of the present invention will become apparent from the following description of exemplary embodiments with reference to the attached drawings.

BRIEF DESCRIPTION OF THE DRAWINGS

FIG. 3 is a diagram illustrating details of an operation unit of an image processing apparatus.

FIG. 6C is a diagram illustrating an example of a setting screen for use in inputting an arbitrary text string to be added using a soft keyboard.

FIG. 6D is a diagram illustrating an example of a setting screen in which an arbitrary text string to be added is specified.

DESCRIPTION OF THE EMBODIMENTS

Embodiments are described below with reference to accompanying drawings. Note that details of these embodiments are described only by way of example but not limitation.

Figure 1:
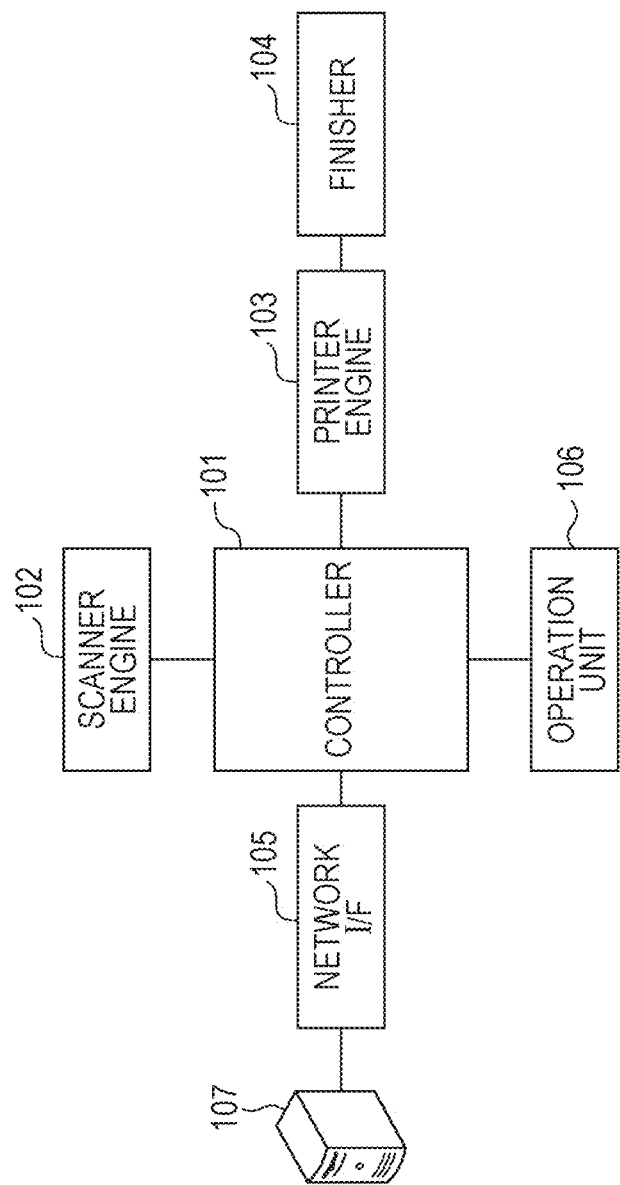
FIG. 1 is a diagram illustrating an overall configuration of an image processing apparatus.

FIG. 1 is a diagram illustrating a configuration of a multi-function peripheral (MFP) as an example of an image processing apparatus according to an aspect. In FIG. 1, reference numeral 101 denotes a controller that controls the MFP. The controller has a hardware configuration illustrated in FIG. 2. Reference numeral 102 denotes a scanner engine, and reference numeral 103 denotes a laser beam printer engine, which are both controlled by a controller 101. The laser beam printer engine 103 is connected to a finisher 104 such that it is possible to staple together a plurality of recording media (such as sheets of paper) output from the laser beam printer engine 103. The finisher 104 is also controlled by the controller 101. Reference numeral 105 denotes a network (Ethernet (registered trademark)) interface that provides two-way communication to the controller 101 via this interface.

Reference numeral 106 denotes an operation unit including an LCD display and a keyboard. The operation unit 106 displays information received from the controller 101 and transmits an instruction given by a user to the controller 101. Reference numeral 107 denotes a user authentication apparatus. In the present embodiment, the user authentication apparatus 107 is located outside the image forming apparatus. However, the image forming apparatus may have a function of the user authentication. The user authentication apparatus 107 performs user authentication according to a user authentication protocol such as LDAP or the like. If a user performs a login operation by inputting user authentication information such as a login name a password on the operation unit 106, then the user authentication information is transmitted by the controller 101 to a user authentication apparatus via a network interface (105). Upon receiving the user authentication information, the user authentication apparatus 107 searches for the login name, the password, or the like from user information stored in a database in the user authentication apparatus 107. If a result of the search indicates that the user is a registered user, user information such as a display language to be displayed on the operation unit 106 is transmitted to the controller 101. When the controller 101 receives the user information, the controller 101 switches the display language and displays a job (such as a copy job) control screen on the operation unit 106.

Figure 2:
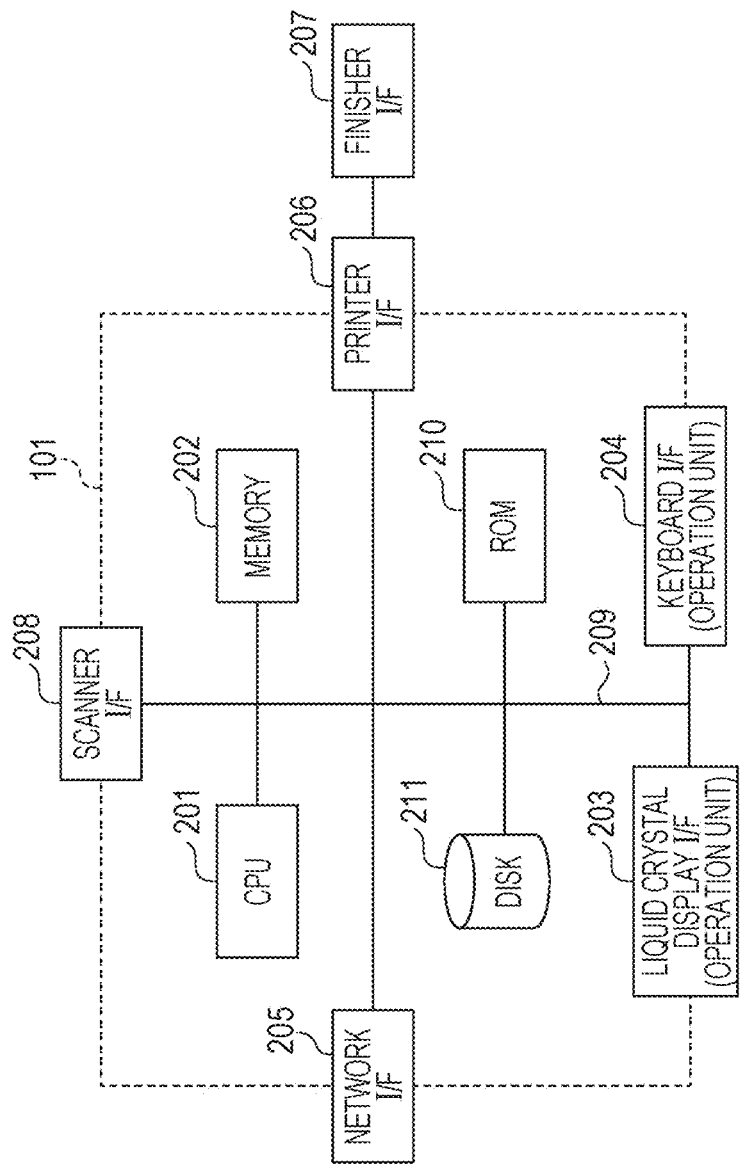
FIG. 2 is a diagram illustrating an overall configuration of an image forming system.

FIG. 2 is a diagram illustrating a hardware configuration of the controller 101 shown in FIG. 1 according to an aspect. In the inside of the controller 101, a CPU 201 is connected, via a bus 209, to a memory 202, a ROM 210, a disk 211, and a liquid crystal display 203 and a keyboard 204 which are both components of the operation unit 106. Various kinds of programs and data are stored in the disk 211 (storage medium) which may be a hard disk, a floppy (registered trademark) disk, or the like. These programs or data are read into the memory 202 as required and executed by the CPU 201. The disk 211 may be attached to the MFP in a removable manner or may be disposed in the MFP. Part or all of the programs may be downloaded from another MFP via a network and may be stored in the disk 211. In general, memories are classified into two types: nonvolatile memories such as an EEPROM and the like; and volatile memories such as a DRAM, SRAM, and the like. The memory 202 may have both functions described above, or the function of the nonvolatile memory may be realized by the memory 202, and the function of the nonvolatile memory may be realized by the disk 211. The memory 202 may be a removable memory medium.

The liquid crystal display 203 and the keyboard 204 are components of the operation unit 106 shown in FIG. 1. The CPU 201 may write data to liquid crystal display 203 to display the data on the liquid crystal display 203. By reading data from the keyboard 204 or the touch-panel liquid crystal display 203, the CPU 201 is capable of receiving an instruction input by a user. Input information is transferred to one of the memory 202, the disk 211, and the CPU 201, and stored thereon and used in various processes. The bus 209 is connected to a network interface 205 corresponding to the network interface 105 shown in FIG. 1. The CPU 201 is capable of performing communication via a network by reading or writing data from or to the network interface 205.

The bus 209 is also connected to a printer interface 206, a finisher interface 207, and a scanner interface 208. These are connection interfaces to the printer 103, the finisher 104, the scanner 102, respectively. By reading or writing data from or to various engines via these interfaces, the CPU 201 performs engine operations such as printing, scanning, and the like and acquires various kinds of status information. Image data may be acquired from the scanner 102 or the network interface 105 and may be stored in the disk 211 or the memory 202 in the controller 101. In a case where the memory 202 is of a removable type, image data may be stored in advance in the memory 202 and the memory 202 may be attached to the controller 101 thereby acquiring the image data. The image data stored in the disk 211 is allowed to be moved or copied to the memory 202. Various images may be combined onto the image data on the memory in accordance with the content of the instruction given via the operation unit 106. Note that the printer 103, the finisher 104, and the scanner 102 respectively connected to the printer interface 206, the finisher interface 207, and the scanner interface 208 do not necessarily need to be disposed in the MFP but they may be separately located on a network and the controller 101 of the MFP may control them.

FIG. 3 is a diagram illustrating a configuration of the operation unit 106. A liquid crystal display unit 301 has a touch panel sheet bonded to a liquid crystal. A system operation screen and softkeys are displayed on the liquid crystal display unit 301. If a displayed key is pressed, location information of the pressed key is transmitted to the controller CPU 201. A start key 302 is used to start an operation of reading an original image or the like. A two-color (green and red) LED 303 is disposed in the center of the start key 302 such that colors thereof indicate whether the start key 302 is in an enabled state or not. A stop key 304 is used to stop an operation being in execution. A ten-key pad includes a set of numeric and character buttons for use in setting the number of copies or the like or instructing switching the screen of the liquid crystal display unit 301, or the like. A user mode key 306 is pressed to perform a device setting.

First Embodiment

Figure 4A:
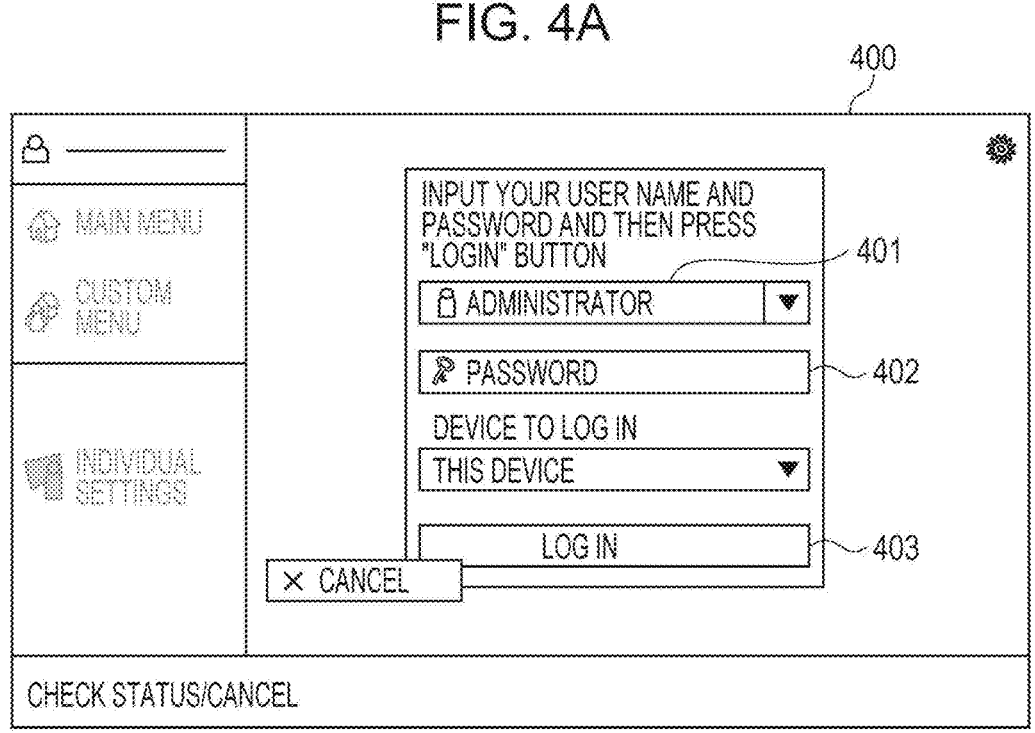
FIG. 4A is a diagram illustrating a user authentication screen.
Figure 4B:
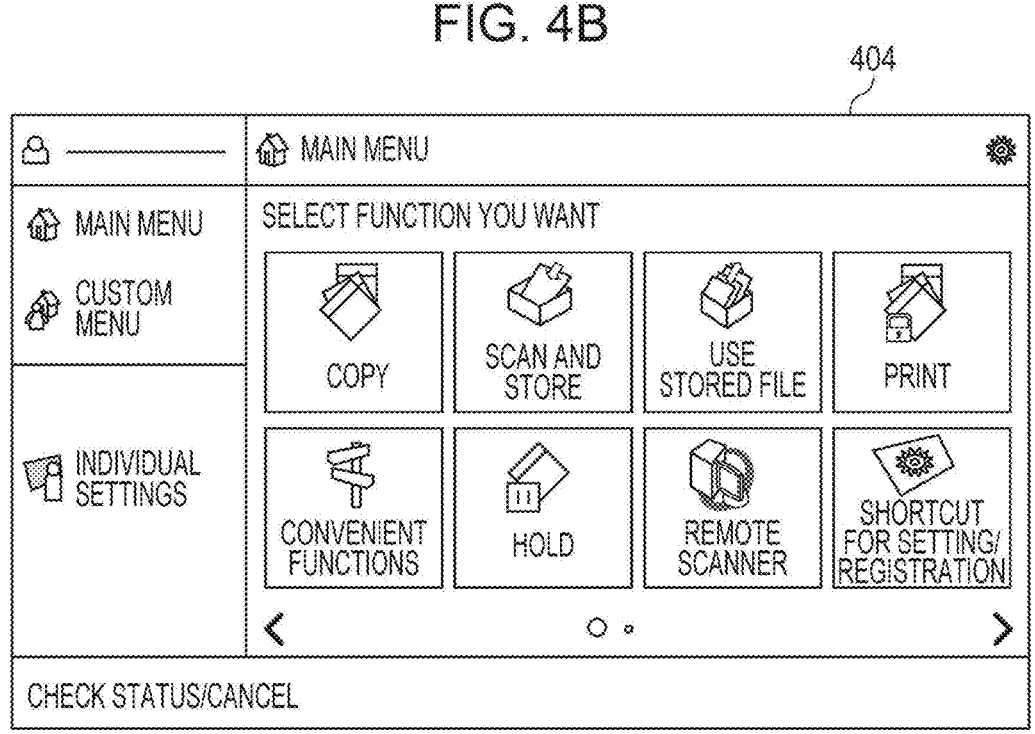
FIG. 4B is a diagram illustrating an example of screen displayed after a login operation is correctly performed.

FIGS. 4A and 4B illustrate manners in which setting screens are display on the liquid crystal display unit 301 of the operation unit 106 FIG. 4A illustrates a screen 400 displayed on the liquid crystal display unit 301 that allows a user to perform a login operation. Operations including controlling the screen displayed on the liquid crystal display unit 301 and communicating with a user authentication apparatus 107 are performed by the CPU 201 by loading an application program into the memory 202 and executing the application program. The screen 400 is a screen that prompts a user to input user authentication information. In the first embodiment, it is assumed by way of example that the system language is Japanese and the login user language is English. Note that languages are not limited to those. A user presses a department ID button 401 and then inputs an ID via the ten-key pad 305. Furthermore, the user presses a password button 402 and inputs a password via the ten-key pad 305. The input ID and password are stored in the memory 202. After inputting information in terms of the ID and the password, the user presses a login button 403. When the login button 403 is pressed, the information in terms of the ID and the password stored in the memory 202 is transmitted to the user authentication apparatus 107 via the network interface 205.

In this process, data is transmitted according to an authentication protocol such as LDAP. A further description of the authentication protocol is omitted herein. When the user authentication apparatus 107 receives the information in terms of the ID and the password, the user authentication apparatus 107 searches the user information stored in an internal database using the ID as a search key and verifies the received user authentication information based on the password. In a case where the password and the ID are valid, the stored user information is transmitted to the controller 101. The application program running on the CPU 201 receives the user information returned from the user authentication apparatus 107 and stores it in the memory 202. When a login operation is performed successfully, the application program switches the screen to a next screen 404 such as that illustrated in FIG. 4B according to the display language information included in the user information such that the screen 404 is displayed, for example, in Japanese when the display language information in the user information is "Japanese", and is displayed, for example, in English when the display language information in the user information is "English". More specifically, when the login operation is performed by a user whose display language is set as "Japanese", descriptions of information associated with buttons and the like on the screen 404 shown in FIG. 4B are changed to descriptions in Japanese. On the other hand, when the login operation is performed by a user whose display language is set as "English", descriptions of information associated with buttons and the like on the screen 404 are changed to descriptions in English.

Figure 5:
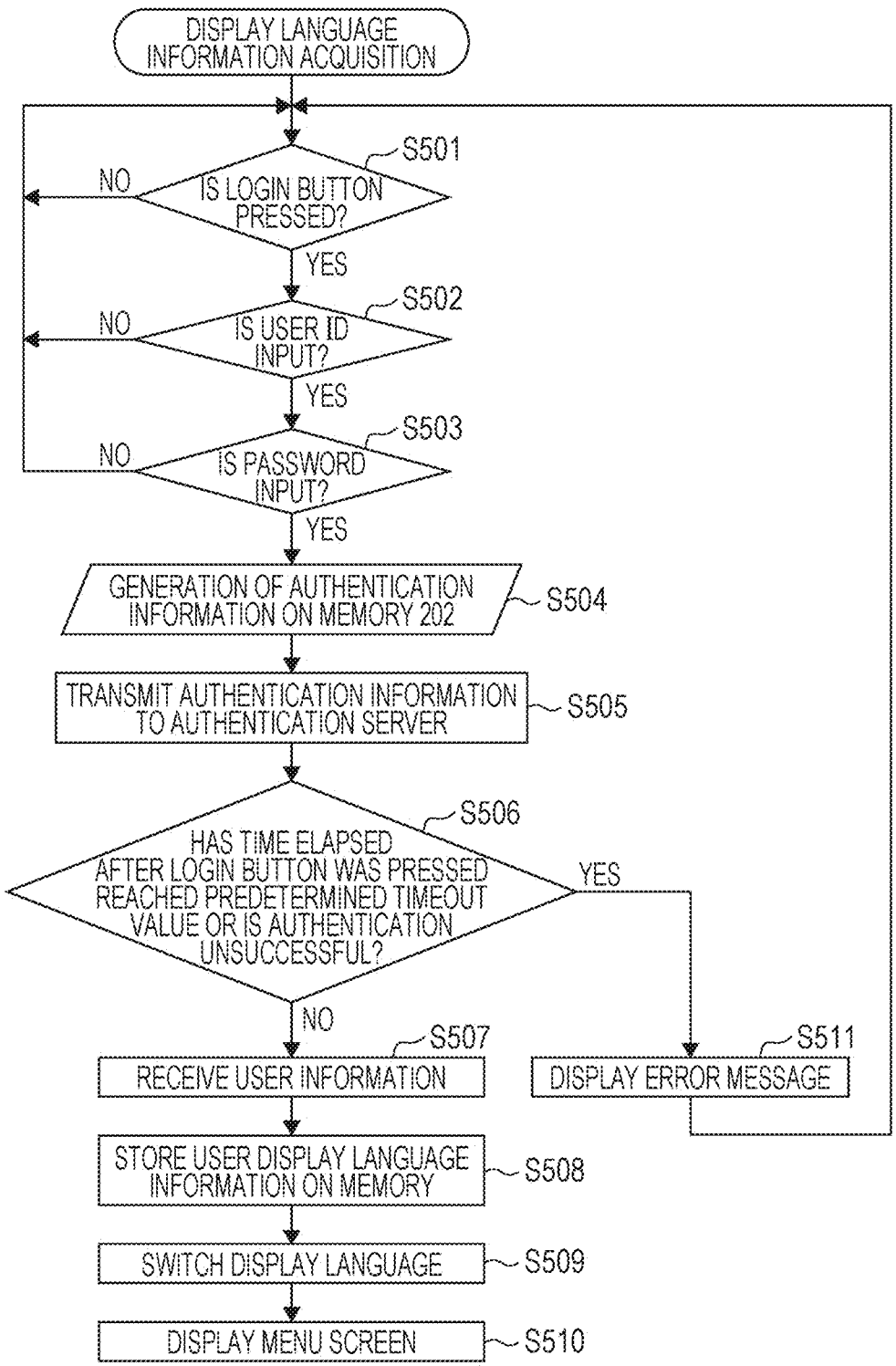
FIG. 5 is a flow chart of a user authentication process.

FIG. 5 is a flow chart illustrating a process associated with switching of a display language and acquisition of display language information. The process shown in the flow chart in FIG. 5 is performed by executing an application program on the CPU 201 in the controller 101.

(S501, S502, S503) First, it is determined whether an ID and a password are input by a user by performing an operation on the screen 400 displayed on the liquid crystal display unit 301 and an operation via the ten-key pad 305.

In a case where it is determined that the login button is pressed and the ID and the password are input, the processing flow proceeds to S504. Note that when it is detected that the login button is pressed, a timer is started to measure an elapsed time since the login button is pressed. In a case where any one of the above conditions is not satisfied, the time is reset and the processing flow returns to S501 in which the process waits until all information has been input.

(S504) Based on the input ID and the password, authentication information is generated on the memory 202. The authentication information is based on LDAP, Active Directory, or the like and is capable of being processed by the user authentication apparatus 107. A data structure of the authentication information is not essential to the present disclosure, and thus a description thereof is omitted herein. The processing flow then proceeds to S505.

(S505) The authentication information generated in the memory 202 is transmitted to the user authentication apparatus 107 via the network interface 205. The processing flow then proceeds to S506.

(S506) If the time elapsed since the login button was pressed is within a predetermined allowable range, then the process still waits in S506. In S506, the process waits until the time elapsed since the login button was pressed reaches a timeout value, or information is received from the user authentication apparatus 107 as to whether the user authentication is passed or not. In a case where the time elapsed since the login button was pressed reaches the timeout value, or in a case where the user authentication is not passed, the processing flow proceeds to S511.

In a case where the user authentication is passed, the processing flow proceeds to S507.

The timeout value may be determined to a fixed value by the system, or may be determined by a user.

(S511) An error message indicating that the login was refused is displayed on the liquid crystal display unit 301, and the process waits in S501 until a login operation is performed again.

(S507) User information is received from the user authentication apparatus 107, and the processing flow proceeds to S508.

(S508) User display language information included in the received user information is stored in the memory 202. The user display language information may be stored in the memory only during a period from the login operation to the logout operation by the user, or may be kept in the memory until the next login operation if the memory space allows it.

The processing flow then proceeds to S509.

(S509) The display language is switched, and the processing flow proceeds to S510.

(S510) The language switching process is completed, and a menu screen is displayed in the switched language.

The user information acquired from the user authentication apparatus 107 includes information as to whether the user has an administrative right. The user information as to whether the user has an administrative right is also used to control whether or not to display a screen for setting in terms of additional information to be printed in composite printing.

Procedure by System Administrator to Make Setting in Terms of Composite Printing FIG. 6A to 6F are diagrams illustrating a procedure performed by a system administrator to make setting in terms of defining an additional print image to be printed in composite printing. In the present embodiment it is assumed by way of example that the display language is English. However, the display language may be another language.

Figure 6A:
FIG. 6A is a diagram illustrating an example of a setting screen for use in setting to enable a function of adding an arbitrary text string in composite printing.

FIG. 6A illustrates a setting screen 600 used by a system administrator. If the user mode key 306 shown in FIG. 3 is pressed and then a particular operation is performed, the setting screen 600 is opened. A description of other intermediate screens is omitted herein. Furthermore, in the present embodiment, text string information is described not in a language-dependent character code such as SHIFT-JIS, EUC, or the like that supports only a particular language, but described in a language-independent character code such as UTF-8 or the like. The operation of changing the screen and the operation of defining setting values are also performed by the CPU 201 by executing an application program.

After login is made by a user having the administrative right to perform settings associated with defining print image to be added, the screen 600 is displayed. Note that this screen 600 is allowed to be displayed only when login is performed by a user having the administrative right. If an extension print enable button 601 on the screen 600 is pressed, a composite print function is enabled and thus it becomes possible to print an additional print image on a print medium. If an extension print disable button 602 is pressed, this function is disabled. If the extension print enable button has been pressed, it is allowed to select additional information to be printed on the print medium in the composite print mode. More specifically, an administrator is allowed to select information to be added to the print medium from the following: a user name addition function 603; a date addition function 604; and a character addition function 605. Herein, it is assumed that the character addition function 605 is selected and a next button 606 is pressed.

Figure 6B:
FIG. 6B is a diagram illustrating an example of a setting screen for use in specifying an arbitrary text string to be added.
Figure 6E:
FIG. 6E is a diagram illustrating an example of a setting screen for use in setting of text string alignment.
Figure 6F:
FIG. 6F is a diagram illustrating an example of a setting screen for use in setting of a display language and a keyboard.

If the next button 606 is pressed, a screen 607 shown in FIG. 6B is displayed. On the displayed screen 607, if an input button 608 is pressed, then a text string setting screen 609 is displayed as illustrated in FIG. 6C. A text string may be input by operating a soft keyboard displayed on the screen 609. Thereafter, if an OK button 610 is pressed, the text string is stored in the memory 202. Note that this information cannot be rewritten by a login user who does not have the administrative right. That is, rewriting is performed only when switching of the display language is performed or a text string is re-registered by an administrator. When the text string registration process is completed, a screen 611 shown in FIG. 6D is displayed. Although the next button 615 is in a grayout state in the screen 607, the next button 615 is changed into a normal state in this screen 611 and the next button 615 is enabled. If the next button 615 is pressed, a character alignment setting 616 shown in FIG. 6E is displayed. On the screen 616, it is allowed to specify a print position of the text string to be printed in the composite printing by selecting one of the following: left alignment; center alignment; and right alignment. That is, in a case where it is set on the screen 600 shown in FIG. 6A that a plurality of print images to be added are selected, the setting on the screen 616 may be performed to specify relative positions among text strings having different lengths.

Herein it is assumed by way of example but not limitation that only characters are specified as a print image to be added. Furthermore, herein it is assumed by way of example but not limitation that the text string given as the print image to be added is printed in an upper right corner of a document. The printing position of the added print image may not be fixed to a particular position, but may be arbitrarily selected by an administrator user.

A back button 618 is used to get back to a previous screen, that is, the setting screen 611 to perform resetting. A cancel button 617 is used to discard all input information.

After the inputting of the text string is completed, the display language may be switched from "Japanese" to "English". If an OK button on the screen 616 in FIG. 6E is pressed, the screen is switched to a screen 620 for use by an administrator to select the display language/keyboard shown in FIG. 6F. In this specific example shown in FIG. 6F, "Japanese" is currently specified as the display language.

Figure 6G:
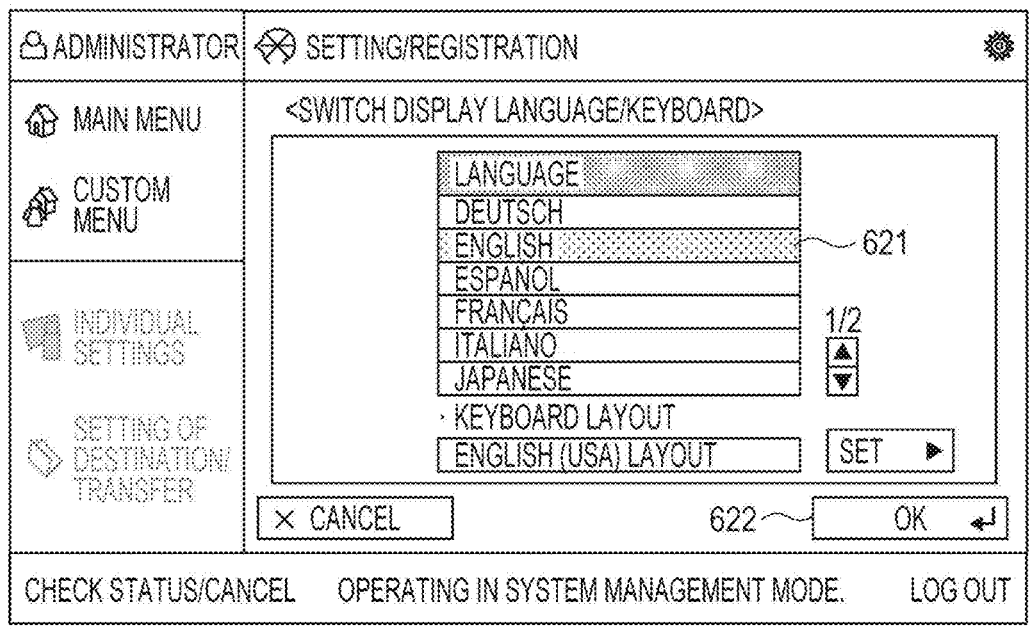
FIG. 6G is a diagram illustrating an example of a setting screen for use in setting of a display language and a keyboard.
Figure 6H:
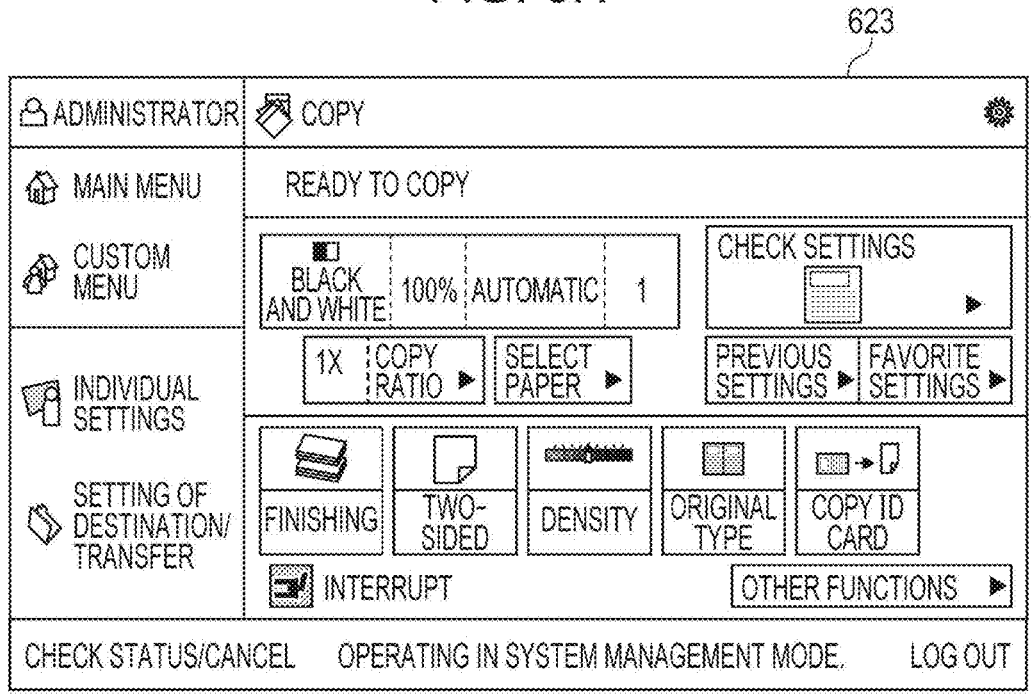
FIG. 6H is a diagram illustrating an example of a setting screen for use in setting of a copy operation.
Figure 7:
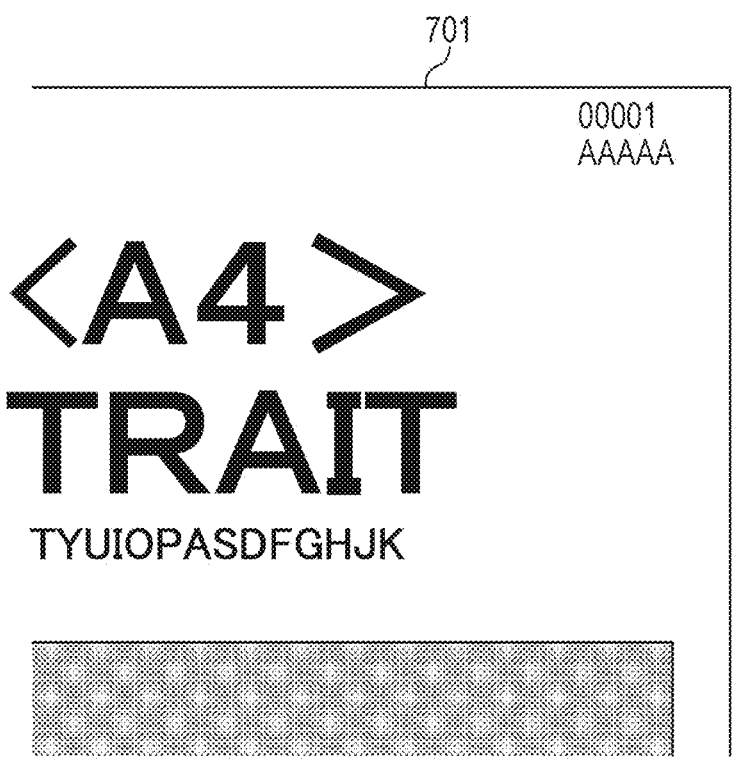
FIG. 7 is a diagram illustrating an example of a manner in which an arbitrary text string is printed in a composite printing mode according to an embodiment.

If "English" denoted by reference numeral 621 in FIG. 6G is selected on the manager display language/keyboard selection screen 620, and then an OK button 622 is pressed, the display language is switched from "Japanese" to "English". In response, the display language of a copy operation screen 623 shown in FIG. 6H is switched from the current display language to the selected new display language, that is, in this specific example, from "Japanese" to "English". In FIG. 7, 701 represents an example of a composite print image obtained when printing is performed after the setting is performed in the above-described manner.

Figure 8:
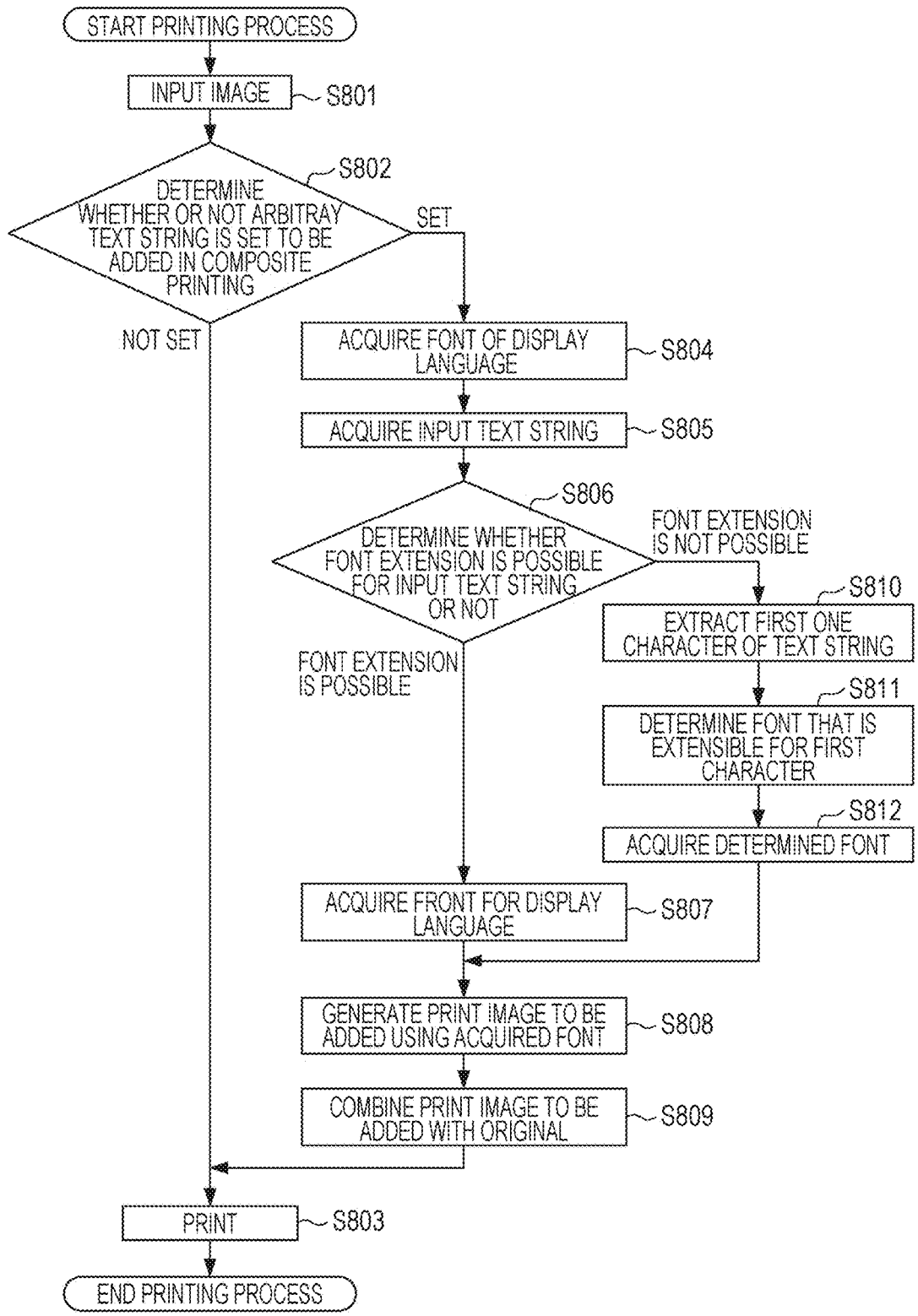
FIG. 8 is a flow chart illustrating a printing process, in a situation in which an arbitrary text string to added is specified to be added, according to an embodiment.

FIG. 8 is a flow chart illustrating an operation of printing in a composite printing mode after the setting on FIGS. 6A to 6H is completed. In FIG. 8, S801 to S812 denote processing steps of the operation. These processing steps shown in the flow chart are executed by an application program on the CPU 201. The processing steps in the flow chart in FIG. 8 are described in detail below.

Printing in Composite Print Mode (Font Extension)

The printing process starts from "start printing process" in the flow chart in FIG. 8.

(S801) An image to be printed is input. After S801, the processing flow proceeds to S802.

(S802) It is determined whether or not an arbitrary text string is set as an image to be added. In a case it is determined in S802 that an arbitrary text string to be added is set, the processing flow proceeds to S804 but otherwise the processing flow proceeds to S803.

(S804) A font used in the display language is acquired. After S804, the processing flow proceeds to S805.

(S805) The input arbitrary text string is acquired. After S805, the processing flow proceeds to S806.

(S806) It is determined whether or not font extension is possible for the input text string using the acquired font of the display language. In a case where it is determined that the font extension is possible, the processing flow proceeds to S807. In a case where it is determined that the font extension is impossible, the processing flow proceeds to S810.

(S807) A font type used in the display language is acquired. After S807, the processing flow proceeds to S808.

(S808) The font extension is performed using the acquired font type and a print image to be added is generated. After S808, the processing flow proceeds to S809.

(S809) An image is generated by combining the to-be-added print image generated in S808 with an original image. After S809, the processing flow proceeds to S803.

(S803) The resultant composite image generated in S809 is printed. After the printing is completed, the present process in the flow chart is ended.

On the other hand, in a case where it is determined in S806 that the font extension is impossible, the processing is performed as follows.

(S810) A first character in the input arbitrary text string is extracted. After S810, the processing flow proceeds to S811.

Figure 10:
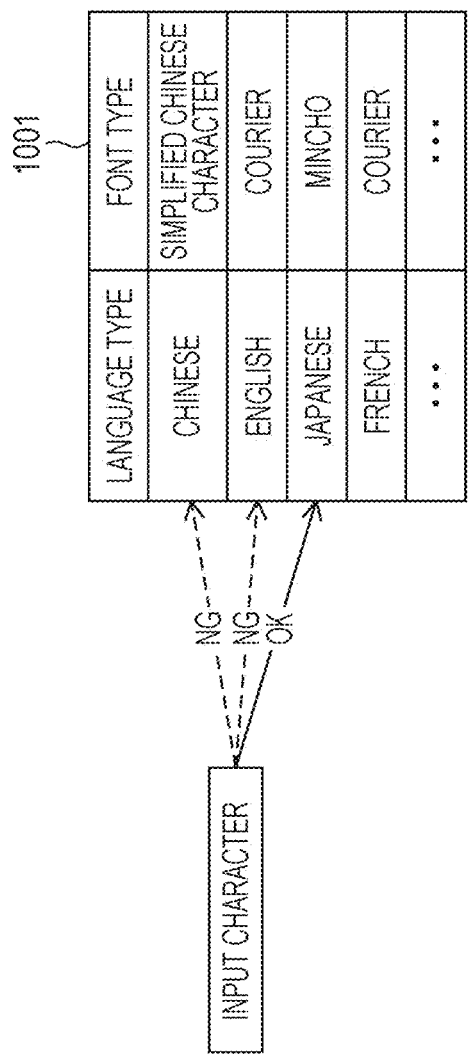
FIG. 10 is a diagram illustrating an example of a logic of searching a font table.

(S811) A font is detected that allows it to perform the font extension for the extracted first character. More specifically, in this step S811, as illustrated in FIG. 10, a font is acquired from a font table 1001 and it is checked whether the font extension using this font is possible for the input text string. The checking is performed sequentially one by one for fonts in the font table 1001 until a font is detected that allows the font extension. After the extensible font is detected in S811, the processing flow proceeds to S812.

(S812) The font type detected in S811 is acquired. After S812, the processing flow proceeds to S808. Thereafter, steps S808, S809, and S803 are performed sequentially. After these steps, the present process of the flow chart is ended.

On the other hand, in a case where it is determined in S802 that there is no arbitrary text string being set, printing in S803 is performed, and then the present process of the flow chart is ended.

A further detailed description is not given as to the process, in S807, of combining the additional print image with the document. The process of combining the composite print image with the document may be a software process performed by application software or may be a process performed by hardware dedicated to the composite printing process. To add an print image to an original image, it may be allowed to use a font extension technique in which a bitmap image is generated using a font depending on a specific display language and information of a text string using a unicode or the like that does not depend on the display language. As for the font extension technique to generate a text string in the form of a bitmap image, various techniques such as that using a bitmap font, that using a vector font, and the like are known. In the present embodiment, proper one of such font extension techniques may be employed although a further detailed description thereof is omitted herein.

Text String Image Generation Module

Figure 9:
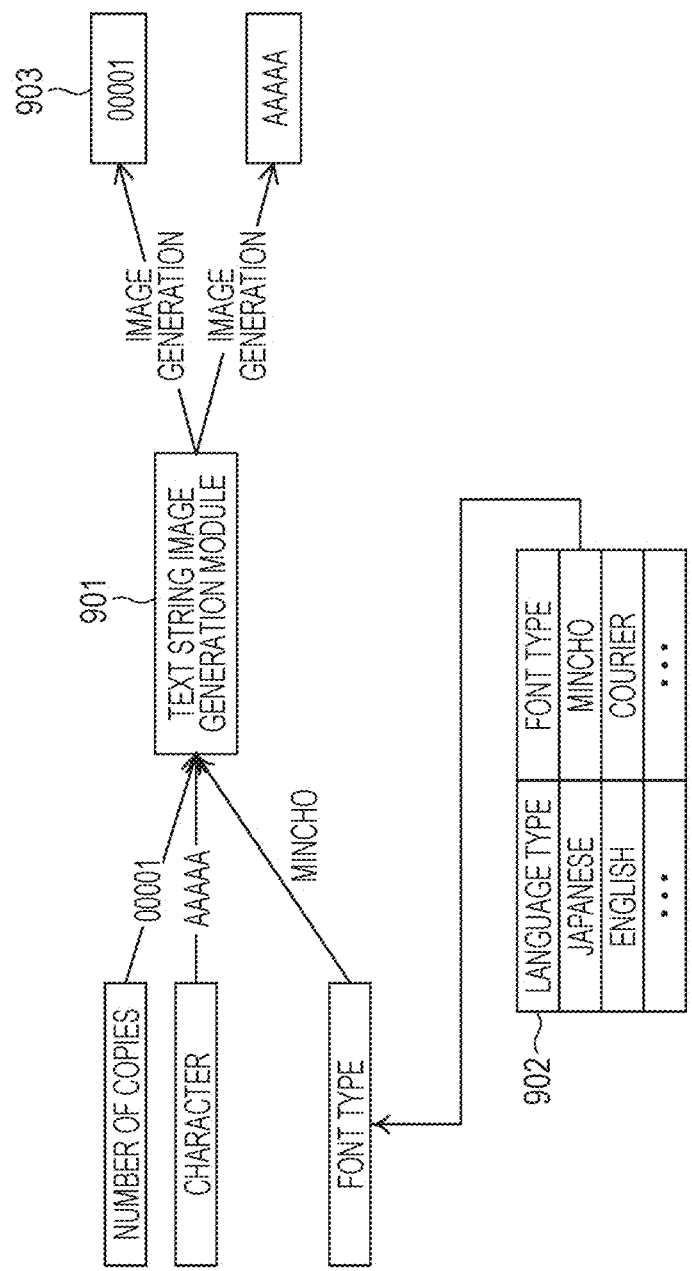
FIG. 9 is a diagram illustrating a text string image generation module and a font table.

The additional print image generation module in S808 may be realized, as illustrated in FIG. 9, by a text string image generation module 901 that generates a bitmap image according to input data using a font extension technique. Note that the text string image generation module 901, which generates a bitmap image using the font extension technique, may also be realized using application software. The text string image generation module 901 specifies a font type corresponding to one of fonts stored in the disk 211 or the ROM 210 in the image forming apparatus and inputs a text string thereby generating a bitmap image 903. The font type specified in the text string image generation module 901 is determined depending on a language type as in the case where the font table 902 is used. The fonts stored in the image forming apparatus does not necessarily need to have common ability.

Figure 11:
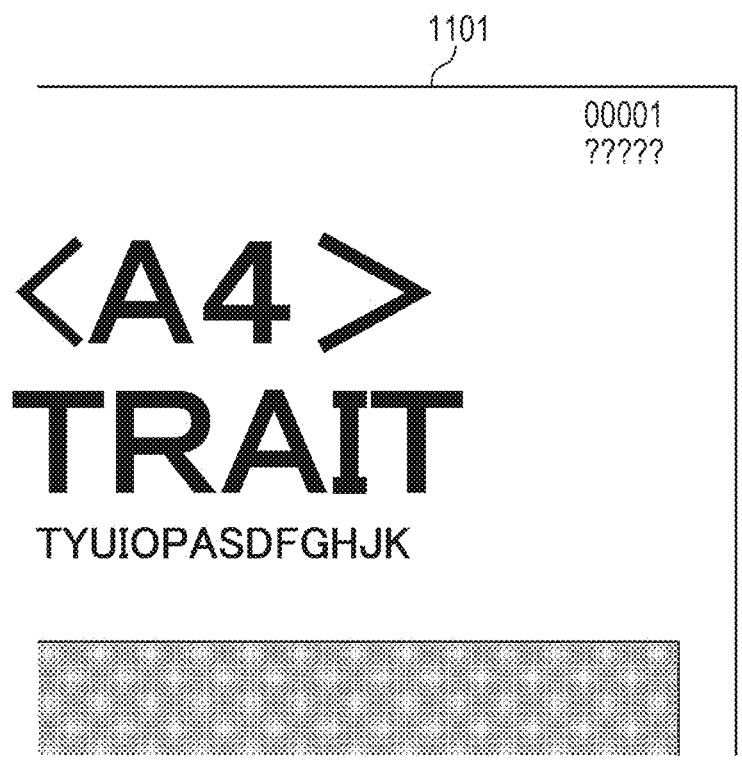
FIG. 11 is a diagram illustrating an example of an arbitrary text string image that fails font extension.

As described above, according to the present embodiment, it is possible to perform font extension for an arbitrary text string to be added, for example, as illustrated in FIG. 7 even in a situation in which the conventional technique is not capable of performing font extension for the arbitrary text string to be added as in an example denoted by 1101 in FIG. 11.

Application to UI Screen

Figure 12:
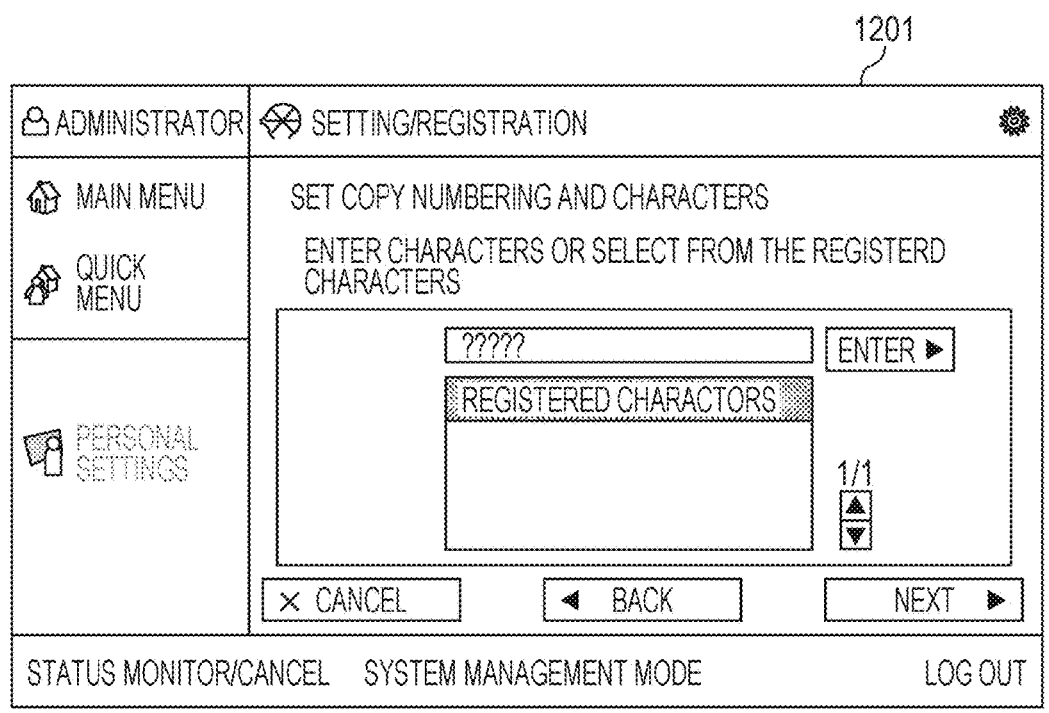
FIG. 12 is a diagram illustrating an example of a UI screen on which there is a text string image that is not correctly displayed.

The processing steps from S804 to S812 shown in FIG. 8 may also be applied to a case where a text string is displayed on a UI screen. Use of the processing steps from S804 to S812 makes it possible to display a text string in a font of a display language which is otherwise not capable of being displayed on a UI screen such as that illustrated in FIG. 12.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242131, filed Nov. 28, 2014 which is hereby incorporated by reference herein in its entirety.

What is claimed is:

1. A printing apparatus comprising:
a printer engine;
a controller having a processor and a memory storing a program which is executed by the processor, the controller being configured to be able to:
set a first display language;
register a character for printing a corresponding pattern in a predetermined position in a page for printing in character code whose image is displayed using a first font associated with the set first display language;
after the registration, set a second display language different from the first display language;
input an image;
after the setting of the second display language, determine whether a second font associated with the set second display language is capable of generating an image of the registered character, by using the character code of the registered character and the set second font; and
if the determination determines that the second font is not capable of generating an image of the registered character, acquire a font which is capable of generating an image of the registered character by searching a plurality of fonts stored in the printing apparatus for the font by checking sequentially, until the font is found, the plurality of fonts one by one using the character code of the registered character;
generate the image of the registered character using the acquired font; and
merge the input image and the generated image of the registered character using the character code of the registered character which is different from the second display language to generate an image to print by a print engine.

2. The printing apparatus according to claim 1, wherein the controller is configured to authenticate a first user who logs into the printing apparatus after the registration, and set the second display language associated with the first user.

3. The printing apparatus according to claim 2, wherein the controller is configured to register the character input by a second user, wherein the first user and the second user are different users.

4. The printing apparatus according to claim 1, wherein the controller is configured to:
register a character string which includes the character as a heading character of the character string;
determine whether the second font is capable of generating an image of the character included in the registered character string; and
based on at least the determination, extract only the heading character of the registered character string, acquire the font by searching the plurality of stored fonts using a character code of the extracted heading character for the font which is capable of generating an image of the extracted heading character, and generate an image of a whole of the registered character string using the acquired font to print the generated image of the character string by the printer engine.

5. The printing apparatus according to claim 1, wherein the generated character image is printed with an input image.

6. The printing apparatus according to claim 1, wherein a display language is a language in which information on a screen is displayed.

7. A method of controlling an apparatus for printing an image of a character comprising:
holding a plurality of fonts;
setting a first display language;
registering the character for printing a corresponding pattern in a predetermined position in a page for printing in character code whose image is displayed using a first font associated with the first display language;
after the registration, setting a second display language different from the first display language;
inputting an image;
after the setting of the second display language, determining whether a second font associated with the second display language is capable of generating an image of the registered character, by using the character code of the registered character and the set second font; and
if the determination determines that the second font is not capable of generating an image of the registered character, acquiring a font which is capable of generating an image of the registered character by searching the plurality of held fonts for the font by checking sequentially, until the font is found, the plurality of fonts one by one using the character code of the registered character;
generating the image of the registered character using the acquired font; and
merging the input image and the generated image of the registered character using the character code of the registered character which is different from the second display language to generate an image to print by a print engine.

8. The method according to claim 7, further comprising authenticating a first user who logs in the apparatus after the registration, and set the second display language associated with the first user.

9. The method according to claim 8, wherein the registering registers the character input by a second user, wherein the first user and the second user are different users.

10. The method according to claim 7,
wherein the registering registers a character string which includes the character as a heading character of the character string;
wherein the determining determines whether the second font is capable of generating an image of the character included in the registered character string; and
wherein the acquiring includes:
extracting only the heading character of the registered character string, and
searching the plurality of held fonts using a character code of the extracted heading character for the font which is capable of generating an image of the extracted heading character to acquire the font, and
wherein the generating generates an image of the registered character string including the character using the acquired font to print the generated image of the character string.

11. The method according to claim 7, wherein the generated character image is printed with an input image.

12. The method according to claim 7, wherein a display language is a language in which information on a screen is displayed.

* * * * *